United States Patent [19]

Boyd

[11] Patent Number: 4,460,433

[45] Date of Patent: Jul. 17, 1984

[54] PRESSURE ROLLER FOR ROOFING MACHINES

[76] Inventor: Walter K. Boyd, 3100 Maricopa, Riverside, Calif. 92507

[21] Appl. No.: 439,263

[22] Filed: Nov. 4, 1982

[51] Int. Cl.³ .............................................. E04D 15/06
[52] U.S. Cl. ................................. 156/574; 29/116 R; 29/126; 29/127; 156/577; 156/579; 156/582
[58] Field of Search ............... 156/555, 574, 577, 579, 156/582; 29/126, 127, 116 R

[56] References Cited

U.S. PATENT DOCUMENTS 3,132,581  5/1964  Isbey et al. ........................... 156/555
3,604,087  9/1971  Beck ....................................... 29/127
4,261,783  4/1981  Finke ..................................... 156/579
4,290,842  9/1981  Gable .................................... 156/579

Primary Examiner—Michael G. Wityshyn
Attorney, Agent, or Firm—Gordon L. Peterson

[57] ABSTRACT

A pressure roller for roofing machines is disclosed which is capable of following dips, rises, and pitch variations in the roof surface along its width while remaining stiff and straight in the directions parallel to the roof surface. A uniform force distribution along the width of the roller is achieved by mounting the roller for rotation about a leaf spring which, in its unstressed condition, has the shape of a curve.

11 Claims, 6 Drawing Figures

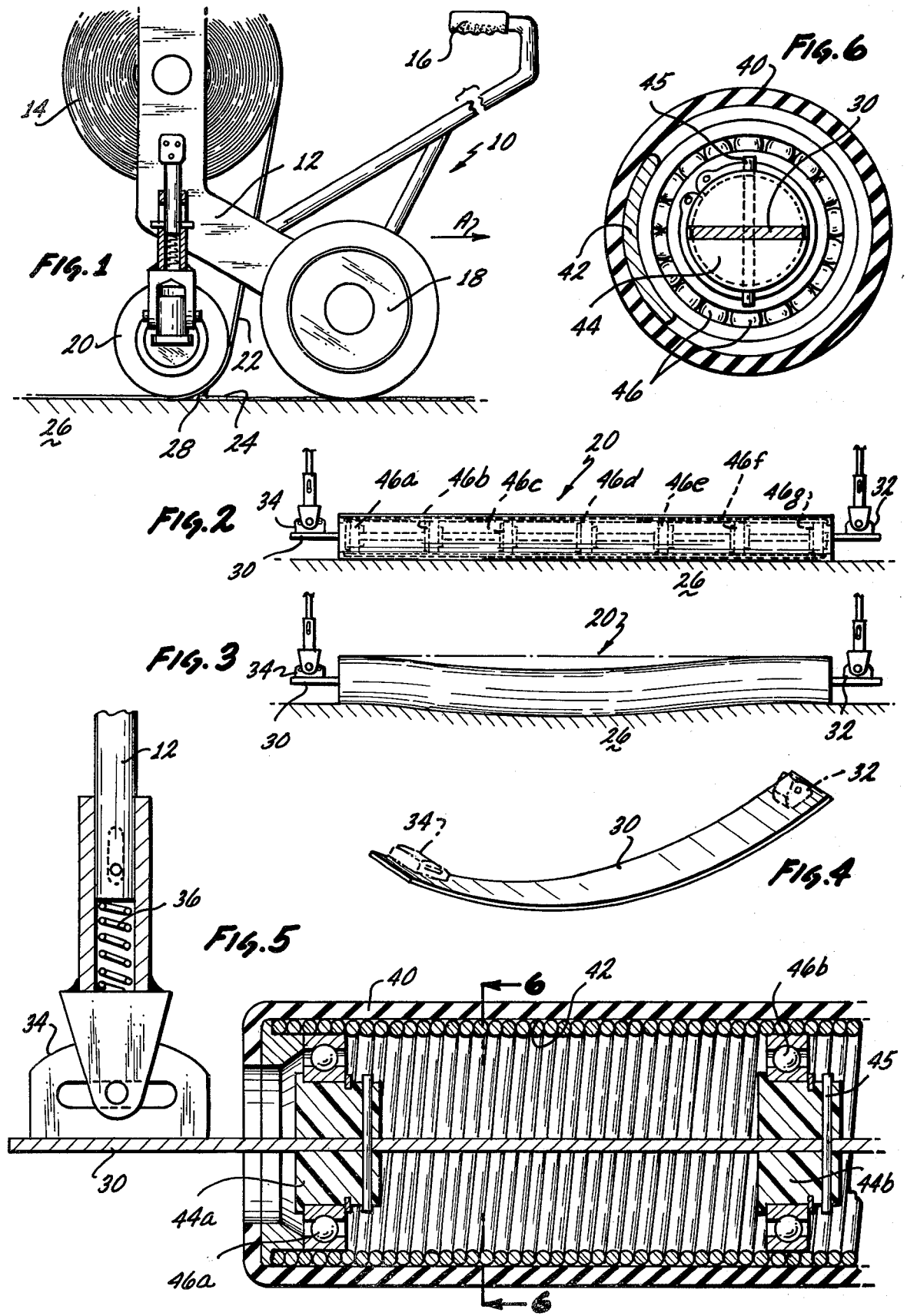

PRESSURE ROLLER FOR ROOFING MACHINES

This invention relates to pressure rollers for roofing machines.

In the construction or maintenance of decks or generally flat-roofed buildings, it is customary to build up a moisture barrier by laying down alternate layers of liquid asphalt and roofing felt or similar material. The felt may advantageously be laid by a roofing machine which consists basically of a wheeled frame which is pulled across the roof by an operator. The frame carries a roll of felt mounted on a storage roller, and a pressure roller which rolls along the roof surface and presses the felt web dispensed from the storage roller against the asphalt layer previously laid down beneath it. A machine of this general type is shown in my U.S. Pat. No. 4,243,468.

It is important, in order to maintain a uniform quality and structure of the moisture barrier, that the pressure roller apply uniform pressure to the felt web throughout the width of the roller, and that the roller be straight when seen from above so as to lay down the web in a straight line. Inasmuch as the roof or deck surface is frequently irregular or uneven, these two requirements call for an inconsistent behavior of the pressure roller: it must be easily flexible in a vertical direction so as to follow the contour of the surface and press against it with uniform force, yet it must be totally rigid in a direction parallel to the roof surface so as to maintain the straight positioning of the web.

SUMMARY OF THE INVENTION

The present invention solves the problem of the above-mentioned inconsistent requirements for the pressure roller by constructing the outer shell of the pressure roller so as to form a flexible cylinder, and mounting that cylinder by means of spaced bearings on a flat axial support member generally in the nature of a leaf spring which is deformable in a direction perpendicular to the roof but not in any other direction.

In order to achieve a generally uniform pressure along the entire width of the roller, the leaf spring of this invention is originally formed, in its unloaded condition, in the shape of a curve defined approximately by a formula discussed in detail in this specification. When a roller mounted on a leaf spring of that curvature is placed against a more or less flat surface, the curvature is flattened out and an approximately constant force is exerted by the roller against the surface throughout its entire width.

In accordance with another aspect of the invention, the entire roller assembly, including its leaf spring support, is resiliently suspended from the frame of the roofing machine so that the axis of the pressure roller need not necessarily be parallel to the axis of the roofing machine's wheels. This enables the pressure roller to maintain a uniform pressure even when the machine is traversing an irregular surface.

It is therefore the object of this invention to provide a pressure roller which is easily deformable in a direction generally perpendicular to the surface on which it rolls while being essentially nondeformable in any direction parallel to the surface on which it rolls.

It is another object of the invention to provide a pressure roller construction which enables the pressure roller to follow contour variations in the surface while maintaining a uniform pressure against the surface throughout its width.

BRIEF DESCRIPTION OF THE DRAWINGS

FIG. 1 is a side elevation, partly schematic, of the pressure roller of this invention showing its relation to a roofing machine;

FIG. 2 is a front elevation of the pressure roller assembly of this invention as positioned on a flat surface, including its leaf spring-type supporting means and its suspension from the frame of the roofing machine;

FIG. 3 is a front elevation similar to FIG. 2 but showing the roller adapting to a depression in the surface;

FIG. 4 is a perspective view of the leaf spring-type roller supporting means of this invention;

FIG. 5 is a vertical section of the roller of this invention along its axis; and FIG. 6 is a vertical section of the roller along line 6—6 of FIG. 5.

DESCRIPTION OF THE PREFERRED EMBODIMENT

FIG. 1 shows, in somewhat schematic form, a roofing machine 10 whose essential elements are a frame 12 supporting a roll 14 of roofing felt and having a handle 16 by which it can be pulled along a roof in the direction of arrow A. The machine rests on wheels 18 and, in operation, on the pressure roller 20 which is the object of this invention. The web 22 of roofing felt is dispensed from the roll 14 and is guided around the pressure roller 20 which presses it against a surface on which a liquid asphalt or adhesive layer 24 has previously been spread. Alternatively, the asphalt or adhesive may be coated on the web itself. As the machine is drawn forward, a small bead 28 of asphalt or adhesive forms in front of the pressure roller 20. The existence of this bead indicates to the operator that the asphalt layer 24 is sufficiently liquid to produce satisfactory adhesion to the web 22. The uniformity of the bead 28 is also an indication to the operator that the web 22 is being pressed against the asphalt layer 24 with uniform force throughout its width.

Referring now to FIG. 2, it will be seen that the pressure roller 20 is mounted on a support member 30 which preferably takes the form of a leaf spring as best illustrated in FIG. 4. The leaf spring 30 is suspended from the frame 12 by a pivot bracket 32 on one end, and a spring-loaded sliding bracket 34 on the other end. The compression spring 36 allows the axis of roller 20 as defined by support member 30 to tilt with respect to the frame of the machine 10, so as to allow the roller to follow the contour of a roof of varying pitch.

A comparison of FIG. 4 (which shows the leaf spring 30 in its unstressed condition) with FIGS. 2 and 3 (which show the leaf spring and roller as they would look when placed onto a flat surface and an uneven surface, respectively, will show that the leaf spring 30 as well as the roller 20 are deformed vertically in use so as to follow the contour of the roof surface 26 over which the roller 20 is being drawn.

The operation of the roller 20 will be more apparent from an examination of FIGS. 5 and 6, which illustrate the internal structure of the roller 20. The outer surface of roller 20 is formed by a suitable covering 40 made of a resilient material such as rubber. The covering 40 is maintained in a generally cylindrical shape by a helical spring 42 which extends throughout the entire width of the roller 20. The support member or leaf spring 30 extends through the center of the roller 20 and defines its axis. Bearing blocks 44a through 44g are fixedly mounted on the leaf spring 30 by a pin 45. The bearing blocks support ball bearings 46a through 46g whose inner and outer races are connected, respectively, to the bearing blocks 44 and the helical spring 42. The number of bearings 46 is dictated by a suitable compromise between economics and effectiveness. The greater the number of bearings, the more uniform the force distribution will be along the width of the roller 20, but at a greater cost and greater weight.

The shape of the leaf spring 30 is best seen in FIGS. 3 and 6. It will be clear from an examination of those figures that the leaf spring 30 can be deformed relatively easily in a vertical direction in FIG. 5 but is quite stiff in the horizontal plane. For this reason, the roller 20 can readily adapt itself to large or small contour variations in the roof surface but will always present a perfectly straight line from viewed from above.

One of the requirements for effective operation of the roller is that it should press the web 22 against the asphalt layer 24 (FIG. 1) with as uniform a force as possible throughout its width. The pressure (in pounds per linear inch) can be expressed as $$P = \frac{W + 2F}{L} \quad (1)$$

where W is the weight of the pressure roller 20 in pounds, L is the length of the roller in inches, and F is the downward force applied to the brackets 32, 34.

It has been found that, in order to distribute this pressure as evenly as possible throughout the width of the roller 20, the initial curvature of the leaf spring 30, in its unstressed condition of FIG. 4, should be $$y = \frac{Fx(L - x)}{12\, EIL} [L^2 + x(L - x)] \quad (2)$$

where y is the deflection (in inches) of leaf spring 30 at any given point; F is the downward force (in pounds) applied by the frame 12 against the bracket 34; L is the length (in inches) of the roller; I is the moment of inertia of the cross-section of the leaf spring 30; E is the modulus of elasticity of the leaf spring material; and x is the distance (in inches) of the given point from the bracket 34.

It should be understood that equation (2) is an approximation and is generally valid only if the loads F are applied close to the ends of the roller 20, and the maximum deflection of leaf spring 30 is small in comparison to the length of roller 20. Variations in the pressure applied to the web 22 will of course arise to some degree due to the fact that the bearings 46 are discrete rather than continuous, and from the size and severity of any contour variations in the roof surface. However, a leaf spring 30 shaped in accordance with formula (2) above will normally produce a sufficient approximation of a uniform force distribution to be suitable for most practical applications.

I claim:

1. A pressure roller for pressing a web of material against an uneven surface, comprising:
   (a) a rotatable flexible covering,
   (b) means for maintaining said covering in a generally cylindrical shape while allowing the axis of said cylinder to be deformed;
   (c) resilient non-rotatable support means for defining the axis of said cylinder and being resiliently deformable in a direction generally perpendicular to said surface but not in a direction generally parallel to said surface; and
   (d) said support means includes a leaf spring having its shortest dimension generally perpendicular to said surface.

2. The roller of claim 1, in which said maintaining means are helical spring means.

3. The roller of claim 1, further comprising bearing means rotatably mounting said covering and maintaining means on said support means.

4. A pressure roller assembly for pressing a web of material against an uneven surface, comprising;
   (a) a flexible covering;
   (b) helical spring means maintaining said covering in a generally cylindrical shape;
   (c) frame means for rolling said roller over said surface;
   (d) resilient non-rotatable support means associated with said frame means to support said roller, said support means defining the axis of said cylinder and being resiliently deformable only in a direction generally perpendicular to said surface, said support means including a leaf spring; and
   (e) bearing means rotatably mounting said helical spring means on said support means.

5. The assembly of claim 4, in which said support means are mounted on said frame means for resilient pivotal movement with respect thereto.

6. A pressure roller for pressing a web of material against an uneven surface with a generally constant pressure throughout its width, comprising:
   (a) a deformable outer shell in the general shape of a cylinder having a deformable axis;
   (b) leaf spring means defining said axis, said leaf spring means and the axis defined thereby being readily deformable only in a direction generally perpendicular to said surface and being adapted to be supported at locations axially outside of the outer shell; and
   (c) a plurality of bearings spaced along said axis, said bearings mounting said outer shell on said leaf spring means for rotation with respect thereto;
   (d) said leaf spring means having a shape, in their unstressed condition, corresponding generally to a curve defined by the formula $$y = \frac{Fx(L - x)}{12\, EIL} [L^2 + x(L - x)]$$

where F is the amount of any downward force that may be applied to the ends of said leaf spring means; L is the length of said pressure roller; I is the moment of inertia of the cross-section of said leaf spring means; E is the modulus of elasticity of said leaf spring means; y is the deflection (in inches) of leaf spring 30 at any given point; and x is the distance (in inches) of the given point from one of the locations.

7. The roller of claim 6, in which said outer shell includes:
   (i) a flexible covering; and
   (ii) helical spring means disposed inside said flexible covering for maintaining said covering in a generally cylindrical shape.

8. A pressure roller for pressing a web of material against an uneven surface, comprising:

(a) a flexible outer shell adapted to be generally cylindrical;
(b) an elongated resilient support;
(c) bearing means for mounting the outer shell on the support for rotation generally about the axis of the support with the support lying along such axis; and
(d) said support including means for enabling said support to be resiliently deformable in one direction and essentially nondeformable in a second direction which is generally perpendicular to said one direction, said one direction and said second direction extending generally radially of said axis.

9. The roller of claim 8 wherein said support is resilient and curved in the unrestrained condition whereby when said support is essentially straight it applies a preload to the outer shell in said one direction.

10. A pressure roller assembly for pressing a web of material against a roof, comprising:
 (a) a frame;
 (b) means for supporting a supply of the web of material on said frame;
 (c) a pressure roller;
 (d) means for mounting the pressure roller on the frame for rotation about an axis whereby the roller can press the web against the uneven surface; and
 (e) said pressure roller including means for rendering the roller easily deformable in a direction generally perpendicular to said roof but not in directions generally parallel to said roof.

11. The roller assembly of claim 10 including means for preloading the pressure roller in a direction generally perpendicular to the roof and for distributing the preload along the length of the roller.

* * * * *